United States Patent [19]

Mitchell et al.

[11] 4,221,276
[45] Sep. 9, 1980

[54] MOTORCYCLE CONTROLLING SIDECAR FOR HANDICAPPED PERSONS

[76] Inventors: John C. Mitchell, 2612 W. Pierson, Phoenix, Ariz. 85017; Thomas N. Terning, 7501 N. Hoover, Valley Center, Kans. 67147

[21] Appl. No.: 927,133

[22] Filed: Jul. 21, 1978

[51] Int. Cl.³ ............... B62K 27/02; B62K 27/12; B62K 23/02
[52] U.S. Cl. ............... 180/209; 180/210; 180/DIG. 3; 180/336; 280/203; 74/515 E
[58] Field of Search ........ 280/203; 180/77 R, 77 AG, 180/210, 209, DIG. 3; 74/515 R, 515 E

[56] References Cited

U.S. PATENT DOCUMENTS

| 1,231,163 | 6/1917 | Jaggard | 180/25 R |
|---|---|---|---|
| 1,326,377 | 12/1919 | Stocking | 74/515 E |
| 1,398,493 | 11/1921 | Payne | 280/203 |
| 2,826,088 | 3/1958 | Wittick | 74/515 X |
| 3,204,791 | 9/1965 | Williams | 180/25 R X |
| 3,840,085 | 10/1974 | Smith | 280/204 X |

FOREIGN PATENT DOCUMENTS

| 715820 | 12/1931 | France | 280/203 |
|---|---|---|---|
| 105834 | 7/1924 | Switzerland | 180/25 R |
| 1949 | of 1913 | United Kingdom | 180/25 R |
| 179000 | 5/1922 | United Kingdom | 280/203 |

*Primary Examiner*—John P. Silverstrim
*Attorney, Agent, or Firm*—Charles R. Hoffman

[57] ABSTRACT

A motorcycle sidecar securely accommodates a handicapped driver seated in a wheelchair. Handlebars are mounted directly in front of the driver for steering the motorcycle. Other controls, including a throttle, a front brake lever, and a clutch lever are mounted on the handle bars. A rear brake lever and a gear shifting control are conveniently located in the sidecar for manipulation by the handicapped driver. A retractable ramp is provided for permitting the driver to roll his wheelchair into the sidecar. Brackets are provided for securely attaching the sidecar to a conventional motorcycle.

8 Claims, 9 Drawing Figures

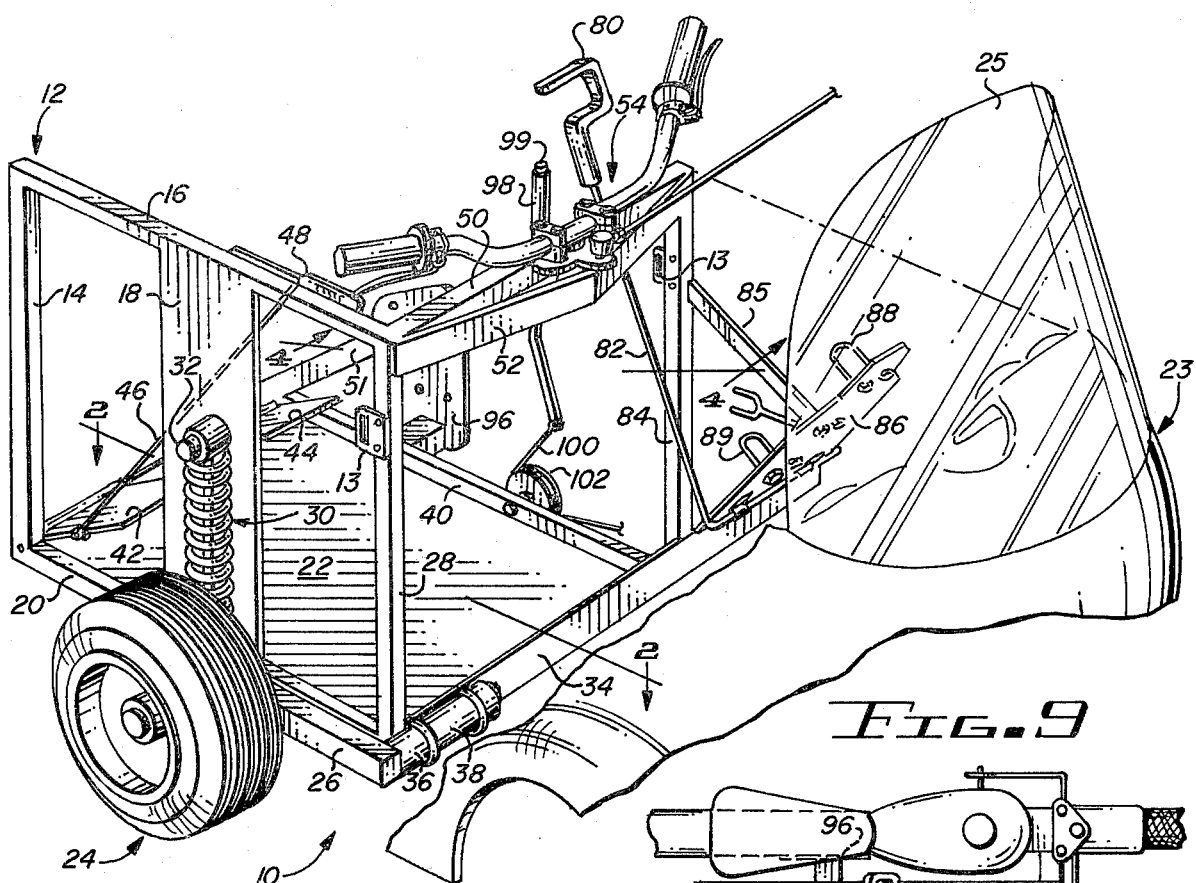
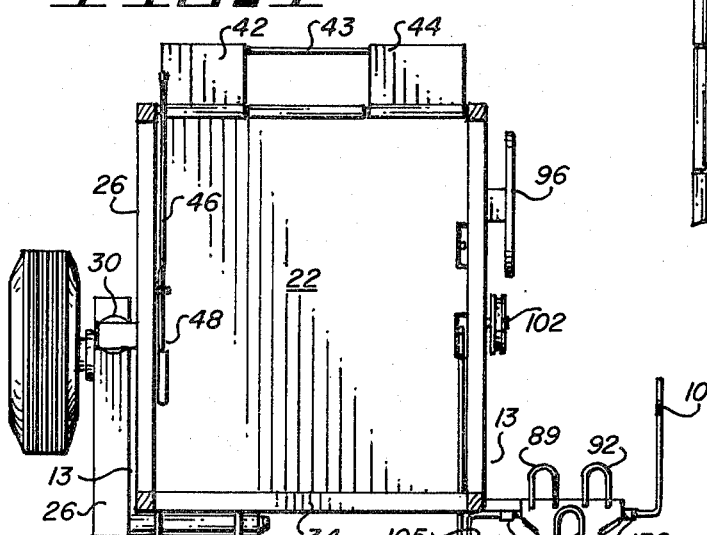
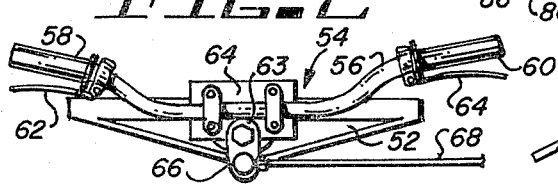
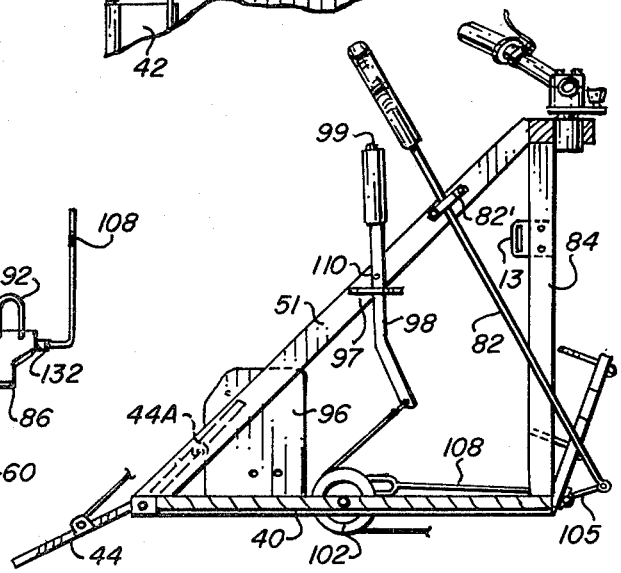

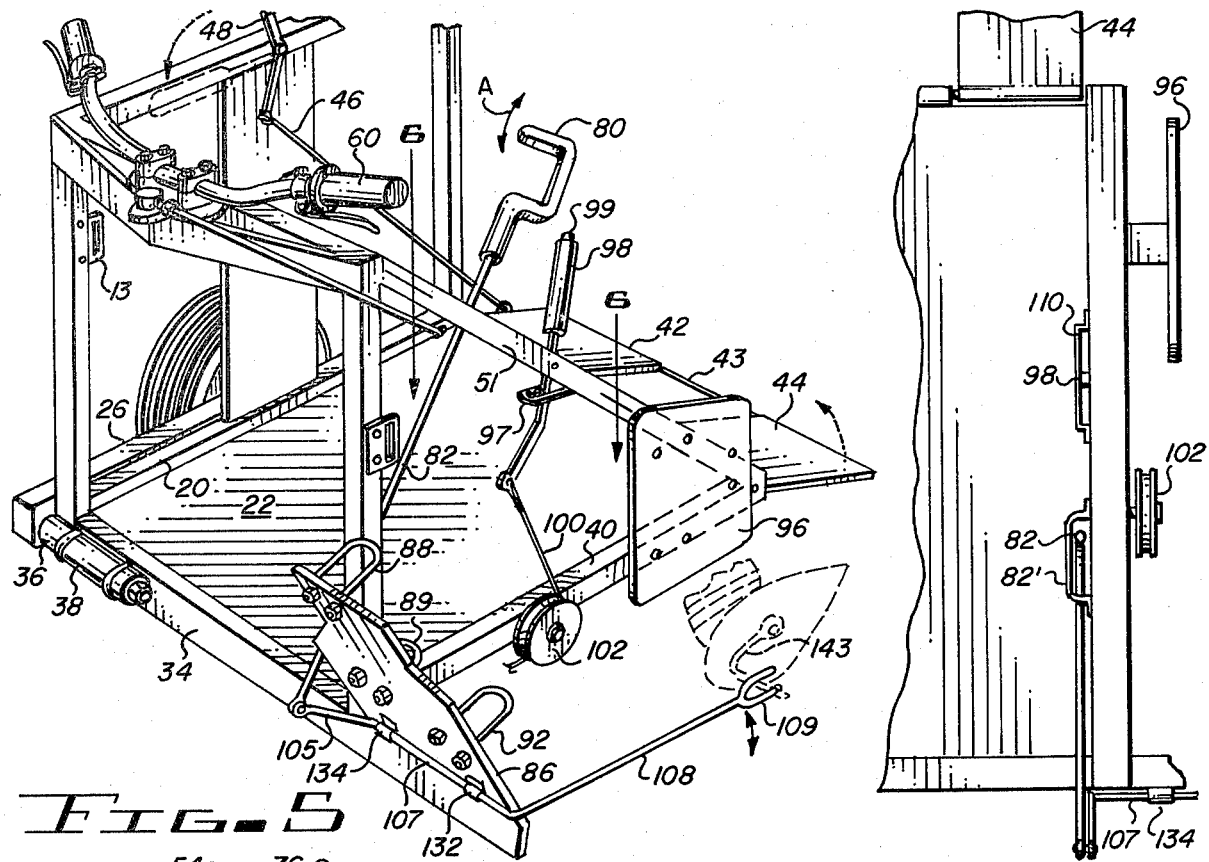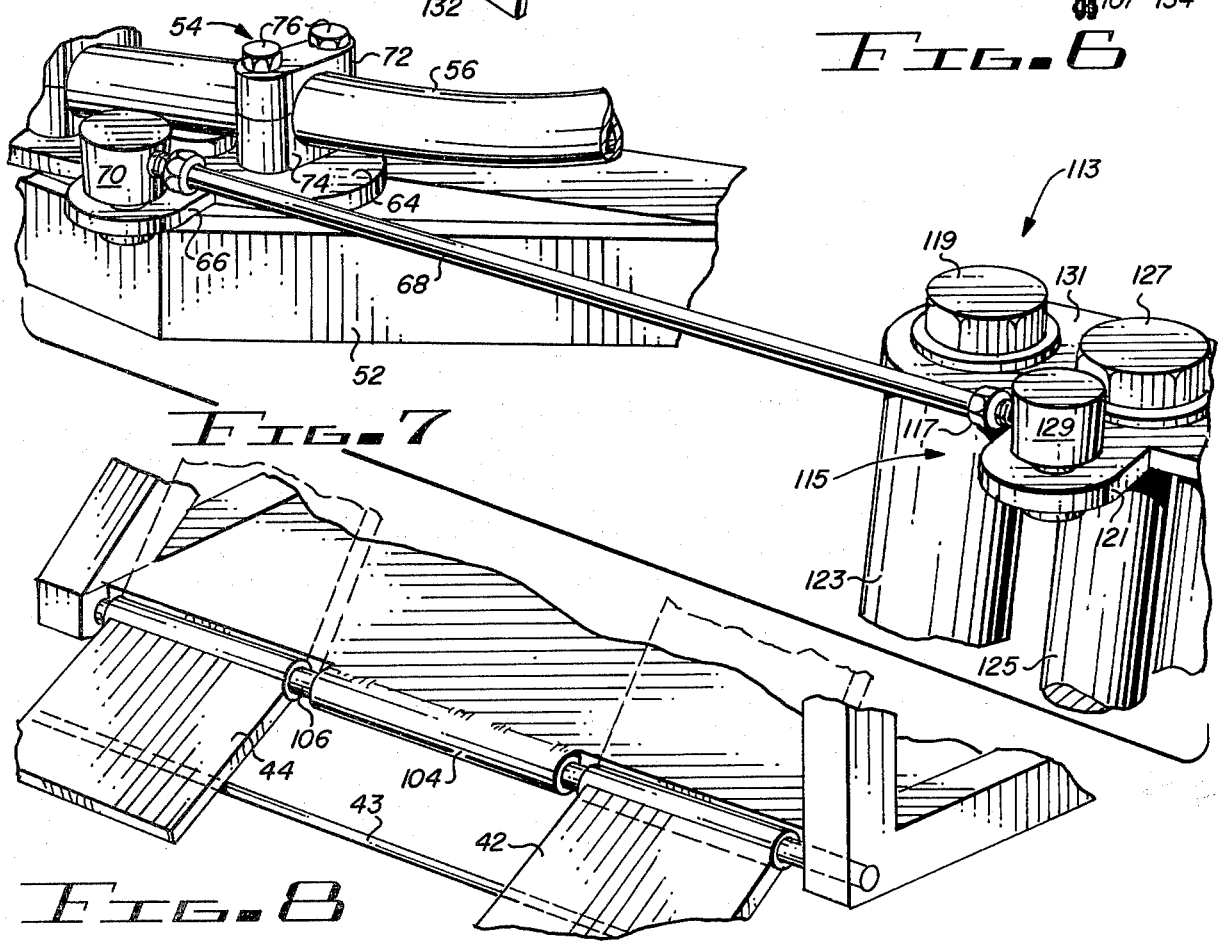

MOTORCYCLE CONTROLLING SIDECAR FOR HANDICAPPED PERSONS

BACKGROUND OF THE INVENTION

1. Field of the Invention

The invention relates to motorcycle sidecars for handicapped persons, and more particularly, to sidecars having steering controls positioned in front of the drive in the sidecar so that the handicapped driver can safely operate the motorcycle from the sidecar.

2. Description of the Prior Art

Various apparatus for enabling paraplegics to drive motor vehicles from place to place are known. For example, accessories for enabling a paraplegic to drive an automobile by means of hand controls for activating the accelerator and brakes are well known. However, the handicapped person must (with a considerable amount of effort, inconvenience, and risk) shift himself out of the wheelchair into the driver's seat of the automobile, bracing and supporting himself precariously, as well as he is able, by grasping the open automobile door, the automobile seat and/or the steering wheel. He must then, while seated in the driver's seat, fold the wheelchair and load it into the automobile behind the driver's seat. This is a difficult and hazardous procedure, especially for paraplegics who are older, overweight, or who do not have acceptionally strong arms and shoulders. There is a great need for an economical means to allow persons not having use of their legs and confined to wheelchairs to conveniently make trips from place to place without having to go through the above procedures.

Various specialized vehicles for accommodating persons seated in wheelchairs are known, such as the vehicle disposed in U.S. Pat. No. 3,204,791. Various motorized wheelchair arrangements are also known, such as the one disclosed in U.S. Pat. No. 3,053,550. However, neither of the latter two patents disclose practical vehicles which would fill the needs described above. Various sidecars for motorcycles and bicycles are known, as disclosed in U.S. Pat. Nos. 1,398,493; 1,824,675; 1,784,746; 1,223,173. U.S. Pat. No. 1,231,163 discloses a motorcycle sidecar with controls therein, one of the motorcycle handlebars extending so that it can be controlled by a driver seated in the sidecar. U.S. Pat. No. 1,398,493 discloses a bicycle with a sidecar connected so that the bicycle can be operated by people incapable of using their legs. Other patents indicating the state of the art include U.S. Pat. Nos. 3,964,564; 1,036,396; and 854,432. Side cars with flat platforms which can accommodate a wheelchair and having a gear shifting linkage extending to the sidecar are also known. However, no sidecar attachable to a conventional motorcycle and having a steering mechanism or the other necessary controls for operating a motorcycle located within convenient reach of a driver seated in a wheelchair in that sidecar is known.

SUMMARY OF THE INVENTION

Accordingly, it is an object of the invention to provide a motorcycle sidecar by means of hand controls located in front of a driver seated in the sidecar.

It is another object of the invention to provide a motorcycle sidecar with handlebars mounted directly in front of a driver in the sidecar and linked to the front fork of the motorcycle.

It is another object of the invention to provide a motorcycle sidecar suitable for securely holding a wheelchair and driver seated in the wheelchair and having hand controls conveniently operable by the person in the wheelchair to safely control the motorcycle.

It is another object of the invention to provide a wheelchair accommodating sidecar with hand controls located in front of the wheelchair, the sidecar being conveniently attachable to a conventional motorcycle.

It is another object of the invention to provide a wheelchair accommodating motorcycle sidecar having a convenient control for activating a gear shifting lever of a motorcycle attached to the sidecar.

Briefly described, and in accordance with one embodiment thereof, the invention provides a sidecar attachable to a motorcycle. The sidecar provides hand controls necessary for safe operation of the motorcycle, such controls being attached to the sidecar such that the motorcycle with sidecar attached thereto can be safely driven by a paraplegic seated in the sidecar. In one embodiment of the invention, handlebars are securely and rotatably mounted directly in front of the driver. The handlebars are connected by means of a tie-rod connecting arm members rigidly attached to the front fork assembly of the motorcycle and to the handlebars, respectively.

Controls for operating the clutch, front brakes, and throttle are mounted on the handlebars. The sidecar has a flat platform and a retractable ramp mechanism for permitting a handicapped driver to roll or maneuver his wheelchair onto the platform and secure the wheelchair directly behind the handlebars. Controls for starting the motorcycle and shifting gears are positioned conveniently so that the driver can operate them as he remains seated in the secured wheelchair. A gear shifting linkage having a hook-like handle which is conveniently activatable by the forearm of the driver includes a crank-like member having a bifurcated end for engaging a normally foot activated shift lever. A rod attached to the hook-like handle is hingably attached to one end of the crank-like member to translate longitudinal movement applied to the hook-like handle to the crank member to shift gears of the motorcycle. In one embodiment of the invention, a fairing and windshield unit are mounted on the sidecar so as to protect the driver from the wind.

BRIEF DESCRIPTION OF THE DRAWINGS

FIG. 1 is a perspective partially exploded view of the motorcycle sidecar of the present invention.

FIG. 2 is a partial view of the sidecar of the present invention taken along section lines 2—2 of FIG. 1.

FIG. 3 is a diagram showing details of the handlebar and tie-rod assembly of the sidecar of the invention.

FIG. 4 is a partial side sectional view taken along section lines 4—4 of FIG. 1 showing details of the retractable ramp, rear brake control, and shifting levers of the sidecar of FIG. 1.

FIG. 5 is another partial perspective view showing details of the sidecar of FIG. 1.

FIG. 6 is a partial top view showing details of the brake and shifting lever mechanisms.

FIG. 7 is a partial perspective diagram showing details of the handlebar, tie-rod, and front fork assembly.

FIG. 8 is a diagram showing details of the retractable ramp assembly.

FIG. 9 is a diagram illustrating the sidecar connected to a motorcycle.

DESCRIPTION OF THE INVENTION

The invention provides an economical sidecar which accomodates a wheelchair. The sidecar can be readily attached to a conventional motorcycle. The handlebars and operating controls of the motorcycle are modified and/or relocated so as to be easily operable by a handicapped driver, who remains seated in the wheelchair.

Referring now to the drawings, and particularly to FIG. 1, sidecar 10 includes a box-like framework having an open back portion for permitting entry of the wheelchair, a left side constructed of metal members 14, 16, 20, and 28 and a web member 18 rigidly welded together as shown. A front side of the framework 12 includes members 50, 28, 34, and 84 welded together in the fashion indicated in the drawings. The right side of box-like framework 12 is triangular in shape, and includes diagonal member 51, bottom member 40 and upright member 84. Bottom plate 22 is welded to members 20, 34, and 40 and performs the function of supporting a wheelchair and a driver seated therein.

Retractable ramp 42, 44 is hinged to bottom plate 22, as indicated in FIG. 8, and can be lowered to permit the driver to roll his wheelchair from the ground onto plate 22 within box-like frame 12. Ramp 42, 44 can then be retracted by means of lever 48 and cable 46, as indicated in FIGS. 1 and 2, in such a position as to retain the wheelchair (not shown) in position within framework 12. A seat belt, not shown, can be looped behind the vertical front tubular frame of most wheelchairs and tightly fastened to fastener 43 of FIG. 1, forcing the front wheels of the wheelchair to abutt horizontal member 34, thereby tightly securing the wheelchair.

Sidecar 12 includes wheel 24 mounted on swing member 26. A shock absorber/spring assembly 30 is attached to web panel 18, as indicated by bolt 32 in FIG. 1. Shock absorber/spring assembly 30 supports the weight of sidecar 10 on swing member 26, which is hingably attached by means of shaft 36 and bearing 38 to horizontal frame member 34, as shown in FIGS. 1 and 2.

Sidecar 10 is rigidly attached to the usual front and side tubular frame members of a conventional motorcycle by means of plate 86 and U-bolts 88, 89, and 92. Plate 86 is rigidly welded to horizontal frame member 34, as indicated in FIGS. 1, 2, 4, and 5. The rear portion of sidecar 10 is attached by means of bracket plate 96, which is rigidly attached to bottom member 40 and diagonal member 51, as clearly shown in FIG. 5. A plurality of U-bolts (not shown) are utilized to attach plate 96 to the diagonal and bottom side tubular frame members of most motorcycles.

It will be appreciated by those skilled in the art that the shapes of front and rear bracket plates, such as 86 and 96, may vary to permit attachment of sidecar 10 to different models of motorcycles. The disclosed sidecar and brackets thereof are particularly adapted to attachment of the inventor's Honda 350cc motorcycle, and have been found to provide reliable and safe connection thereto.

According to the invention, a handlebar assembly 54 is rotatable but rigidly mounted on support member 52, which is mounted on box-like framework 12 by rigid attachment to upright members 28 and 84 and horizontal member 50, as indicated in FIG. 1. Details of the steering assembly 54 are shown more clearly in FIGS. 3 and 7, wherein it is seen that handlebar assembly 56 is connected by means of blocks 72 and 74 and bolts 76 to a plate 64. Plate 64 is rotatably mounted on mounting brace 52 by means of bolt 53, as indicated in FIG. 3. Plate 64 has a outwardly extending arm 66. A tie-rod end element 70 is hingably connected to arm 66 of plate 64. A tie-rod 68 is adjustably connected to tie-rod end element 70, and is also adjustably connected to a second tie-rod end element 129. Tie-rod end element 129 is connected to an outwardly extending arm 121 of a plate 131 rigidly attached to the front fork assembly 113 of a motorcycle to which sidecar 10 is attached. Front fork assembly 113 is pivotally mounted on tubular frame neck member 125 of the motorcycle frame by means of bolt 127 and a shaft (not shown) thereof extending through frame neck member 125. Fork element 123 extends downwardly to support the front wheel of the motorcycle (not shown) in the usual manner. Plate 131 is attached to the front fork assembly by means of bolts 119 and 127.

Thus, it is seen that when the handlebars 56 are turned slightly, the front fork assembly and front wheel of the motorcycle turns a like amount in the same direction, assuming the arms 66 and 121 are of the same effective length. The driver of the motorcycle can thus safely and accurately control steering of the motorcycle and attached sidecar from his seat in a wheelchair positioned within box-like frame 12. Alternatively, various cable or shaft and gear mechanisms could be readily provided to translate rotation of handlebars 56 to the front fork assembly of the motorcycle to enable the handicapped driver to steer the motorcycle and sidecar.

Other hand operated control elements, including throttle grip 58, front brake lever and cable assembly 62 and clutch lever and cable assembly 64 are mounted on handlebars 56, as shown in FIGS. 1 and 3. Other conventional control elements such as a horn button, dimmer switch, headlight and parking light switches, starter switches and the like are completely conventional, and therefore are not shown. A molded fiberglass or plastic fairing 23 is mounted on the front of box-like frame 12. A windshield 25 is mounted on fairing 23, and an instrument cluster is also mounted therein.

For motorcycles not having an automatic transmission, a shifting lever 82, having a hook-like handle 80 operably by the driver's forearm is provided. As shown particularly in FIG. 5, shift lever 82 is longitudinally slideably disposed in bracket 108. Shift lever 82 is hingeably connected to crank member 105, 107, 108, as shown in FIG. 5. Portion 108 of the crank member extends perpendicularly from portion 107 thereof. Portion 107 is rotatably hinged to plate 86 by means of hinge brackets 132 and 134. Portion 108 has a bifurcated end 109 for engaging gear shifting lever 143 of the motorcycle to which the sidecar is attached. The end section 105 of the crank element is hingeably connected to the end of shift lever 82, as shown in FIGS. 1, 4, and 5. Thus, it can be seen that longitudinal movement imparted to hook-shaped handle 80 and shift lever 82 by the forearm of the driver as he grasps handle grip 60 causes rotation of crank member 105, 107, 108, causing corresponding vertical movement of bifurcated end 109. This causes shifting of the gears of the motorcycle.

The rear brakes of conventional motorcycles are operated by means of a foot pedal. In sidecar 10, a lever 98 having a ratchet control button 99 mounted on diagonal member 51 is connected by means of a cable 100 and a pulley 102 to the foot operated brake pedal. Thus, when lever 98 is pulled toward the rear of the sidecar by the driver, cable 100 is stressed. The far end of cable 100 is connected to the brake pedal so as to pull the brake pedal downward to apply the rear wheel brakes of the motorcycle. Ratchet button 99, when depressed causes a pawl inside lever 98 to be released from engagement with teeth on bar 97, which is affixed to diagonal member 51. Lever 98 thus functions as an emergency brake as well as a brake to slow the motorcycle and sidecar during normal operation. For motorcycles which have a hydraulic brake system, a hydraulic cylinder is mounted at a convenient location in sidecar 10 to accomplish the desired result; a flexible hydraulic tube extends from the hydraulic cylinder to the rear brake cylinder.

The box-like framework 12 of the embodiment of the invention presently utilized by the inventor is constructed of sturdy iron members welded together. However, lighter materials can be utilized. The sidecar of the invention can be built inexpensively, and the necessary modifications to readily available motorcycles from a large number of manufacturers are quite inexpensive. The sidecar of the invention thus gives persons confined to wheelchairs the opportunity to experience the enjoyment of motorcycling, and permits a convenient means for traveling without the inconvenience of having to dismount from a wheelchair and reposition ones self in the seat of an automobile and store a wheelchair.

I claim:

1. A sidecar for attachment to a motorcycle including a frame, a motor supported by the frame for powering the rear wheel of the motorcycle, a front fork assembly connected to the frame, a foot-actuatable gear shifting lever, and a foot-actuatable brake lever, said motorcycle and sidecar being easily drivable by a driver seated in a wheelchair, said sidecar comprising in combination:
    (a) a support frame;
    (b) means for attaching said support frame to the frame of the motorcycle;
    (c) a wheel and a suspension system for connecting said wheel to said support frame;
    (d) a substantially horizontal support plate attached to said support frame for supporting a wheelchair in which the driver is seated, said support plate and said support frame forming a protected compartment within which the wheelchair and the driver seated in the wheelchair are disposed while the driver operates the motorcycle, said support plate being disposed sufficiently close to a road surface supporting the motorcycle and the sidecar to permit easy entry of the wheelchair into said compartment by the driver;
    (e) steering means connected to said support frame directly in front of the driver for enabling the driver to easily steer the motorcycle while seated in the wheelchair in said compartment;
    (f) means for connecting said steering means to the front fork assembly of the motorcycle for translating turning movement applied to said steering means by the driver to produce a corresponding turning of said fork front assembly of the motorcycle; and
    (g) shifting means attached to said sidecar and coupled to said gear shifting lever for enabling the driver to shift gears by means of an arm motion, said shifting means including a hook-shaped end element for engagement by an arm of the driver and a rod-like member attached to said hook-shaped end element, permitting the driver to shift gears of the motorcycle by imparting a longitudinal movement to said rod-like member by engaging said hook-shaped end element with his forearm while grasping said steering means with the hand of that arm.

2. The sidecar of claim 1 wherein the gear shifting lever is located on a first side of the motorcycle and said sidecar is attached to an opposite side of the motorcycle, said rod-like member engaging a crank-like member extending from said sidecar to the first side of the motorcycle, the crank-like member having a bifurcated end which engages the gear shifting lever.

3. The sidecar of claim 1 wherein said steering means includes:
    (a) a handlebar rotatably mounted on said motorcycle sidecar approximately directly in front of the driver, said handlebar having a centered pivot and symmetrically opposed portions, extending away from the centered pivot point;
    (b) a first arm extending from said handlebar means;
    (c) a second arm extending radially from the front fork assembly of said motorcycle; and
    (d) tie-rods means hingeably connecting said first and second arms for translating rotation of said handlebar by said driver to said front fork assembly to cause corresponding rotation of the front fork assembly.

4. The sidecar of claim 3 further including hand-operated emergency brake means hand controllable by the driver for depressing the foot-actuatable brake lever.

5. The sidecar of claim 4 further including moveable ramp means extending at an incline permitting said driver to propel a wheelchair up said incline and onto said support plate.

6. The sidecar of claim 4 including control means connected to said ramp means for retracting said ramp means.

7. The sidecar of claim 3 further including a throttle control and a brake control mounted on said handlebar.

8. The sidecar of claim 3 further including means for securely attaching said sidecar to said motorcycle.

* * * * *